(12) United States Patent
Takahashi et al.

(10) Patent No.: US 7,721,618 B2
(45) Date of Patent: May 25, 2010

(54) RANGE DETECTOR FOR VEHICULAR AUTOMATIC TRANSMISSION

(75) Inventors: Kyohei Takahashi, Kariya (JP); Akira Takagi, Obu (JP)

(73) Assignee: Denso Corporation, Kariya (JP)

( * ) Notice: Subject to any disclaimer, the term of this patent is extended or adjusted under 35 U.S.C. 154(b) by 1111 days.

(21) Appl. No.: 11/233,019

(22) Filed: Sep. 23, 2005

(65) Prior Publication Data

US 2006/0093169 A1 May 4, 2006

(30) Foreign Application Priority Data

Oct. 22, 2004 (JP) ............................. 2004-308399

(51) Int. Cl.
*B60K 20/00* (2006.01)
(52) U.S. Cl. .................. 74/473.1; 200/252; 200/550
(58) Field of Classification Search .................. 74/335, 74/473.1; 200/16 R, 252, 537, 550; 335/205, 335/207

See application file for complete search history.

(56) References Cited

U.S. PATENT DOCUMENTS

| 4,417,107 | A | * | 11/1983 | Terajima | 200/16 C |
|---|---|---|---|---|---|
| 5,078,871 | A | * | 1/1992 | McCready | 210/222 |
| 5,249,476 | A | * | 10/1993 | Zaiser et al. | 74/335 |
| 5,337,625 | A | * | 8/1994 | Jang | 74/335 |
| 5,672,854 | A | * | 9/1997 | Nishio | 200/16 R |
| 5,708,240 | A | * | 1/1998 | Akimoto et al. | 200/16 C |
| 5,729,007 | A | * | 3/1998 | Taniguchi et al. | 250/231.13 |
| 5,860,515 | A | * | 1/1999 | Tomotoshi | 200/550 |
| 5,898,142 | A | * | 4/1999 | Ohtaki et al. | 200/16 C |
| 6,021,368 | A | | 2/2000 | Taniguchi et al. | |
| 6,031,194 | A | * | 2/2000 | Aoki | 200/253 |
| 6,098,482 | A | * | 8/2000 | Ishii et al. | 74/473.11 |
| 6,144,272 | A | * | 11/2000 | Satoh et al. | 335/207 |
| 6,316,936 | B1 | * | 11/2001 | Striker et al. | 324/207.21 |
| 6,610,939 | B2 | * | 8/2003 | Watada | 200/16 D |
| 6,630,636 | B2 | * | 10/2003 | Nakamura | 200/16 R |
| 6,658,961 | B2 | * | 12/2003 | Lee | 74/473.3 |
| 6,827,106 | B2 | * | 12/2004 | Hori et al. | 137/884 |
| 6,921,871 | B2 | * | 7/2005 | Nakazawa et al. | 200/16 R |

FOREIGN PATENT DOCUMENTS

| JP | 01-164847 | 6/1989 |
|---|---|---|
| JP | 05-053064 | 7/1993 |

(Continued)

OTHER PUBLICATIONS

Machine Translation for JP2002175744.*

(Continued)

*Primary Examiner*—Richard W Ridley
*Assistant Examiner*—Matthew A Johnson
(74) *Attorney, Agent, or Firm*—Nixon & Vanderhye PC

(57) ABSTRACT

A slider of a moving portion slides on a sliding surface of a guide portion according to a selected range of an automatic transmission. A plurality of through holes are provided on the sliding surface. A detecting portion detects the range of the transmission based on the position of the moving portion. Particles on the sliding surface are scraped by a slider of the moving portion. The scraped particles drop into the holes to prevent a slider from being stuck.

9 Claims, 19 Drawing Sheets

FOREIGN PATENT DOCUMENTS

| | | |
|---|---|---|
| JP | 05-325731 | 12/1993 |
| JP | 07-174254 | 7/1995 |
| JP | 09-145487 | 6/1997 |
| JP | 09-320389 | 12/1997 |
| JP | 10-297306 | 11/1998 |
| JP | 2002-175743 | 6/2002 |
| JP | 2002-175744 | 6/2002 |
| JP | 2003-097679 | 4/2003 |

OTHER PUBLICATIONS

Japanese Office Action dated Aug. 25, 2009, issued in counterpart Japanese Application No. 2004-308399, with English translation.

* cited by examiner

|  | P | (P-R) | R | (R-N) | N | (N-D) | D |
|---|---|---|---|---|---|---|---|
| H1 | ○ | ○ |  |  |  | ○ | ○ |
| H2 |  | ○ | ○ | ○ |  |  | ○ |
| H3 |  |  |  | ○ | ○ | ○ | ○ |

○ : ON

|    | P | (P-R) | R | (R-N) | N | (N-D) | D |
|----|---|-------|---|-------|---|-------|---|
| E1 | ○ | ○     |   |       |   | ○     | ○ |
| E2 |   | ○     | ○ | ○     |   |       | ○ |
| E3 |   |       |   | ○     | ○ | ○     | ○ |
| E4 | ○ | ○     | ○ | ○     | ○ | ○     | ○ |

○ : ON

RANGE DETECTOR FOR VEHICULAR AUTOMATIC TRANSMISSION

CROSS REFERENCE TO RELATED APPLICATIONS

This application is based on Japanese Patent Application No. 2004-308399 filed on Oct. 22, 2004, the disclosure of which is incorporated herein by reference.

FIELD OF THE INVENTION

The present invention relates to a range detector for a vehicular automatic transmission.

BACKGROUND OF THE INVENTION

JP-2002-175744A shows a conventional range detector for a vehicular automatic transmission. In such a range detector, a movable member slides on sliding surface of a guide member according to a selected rage of the automatic transmission. A range detector detects the position of the movable member to identify the range of the automatic transmission.

When the movable member is positioned in the same position for a long period, dust particles are adhered on the siding surface of the guide member. Particularly, in the range detector positioned in the automatic transmission as shown in JP-2002-175744A, since the operation fluid flows around the movable member, metal particles produced by abrasions of friction elements and gears and contained in the operation fluid tend to be adhered on the sliding surface of the guide member. Such a particles are introduced between the movable member and the sliding surface, which may generate a large sliding resistance. In this case, the movable member hardly moves smoothly, and the sliding member, the guide member, and the detector may be failed, which causes a malfunction of the range detector.

SUMMARY OF THE INVENTION

The present invention is made in view of the foregoing matter and it is an object of the present invention to restrict the malfunction of the range detector.

According to a range detector of the present invention, a slider of a moving portion slides on a sliding surface of a guide portion according to selected range of an automatic transmission. A plurality of through holes is provided on the sliding surface. A detecting portion detects the range of the transmission based on the position of the moving portion. Particles on the sliding surface are scraped by a slider of the moving portion. The scraped particles drop into the holes to prevent a slider from being stuck.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

First Embodiment

Figure 2:
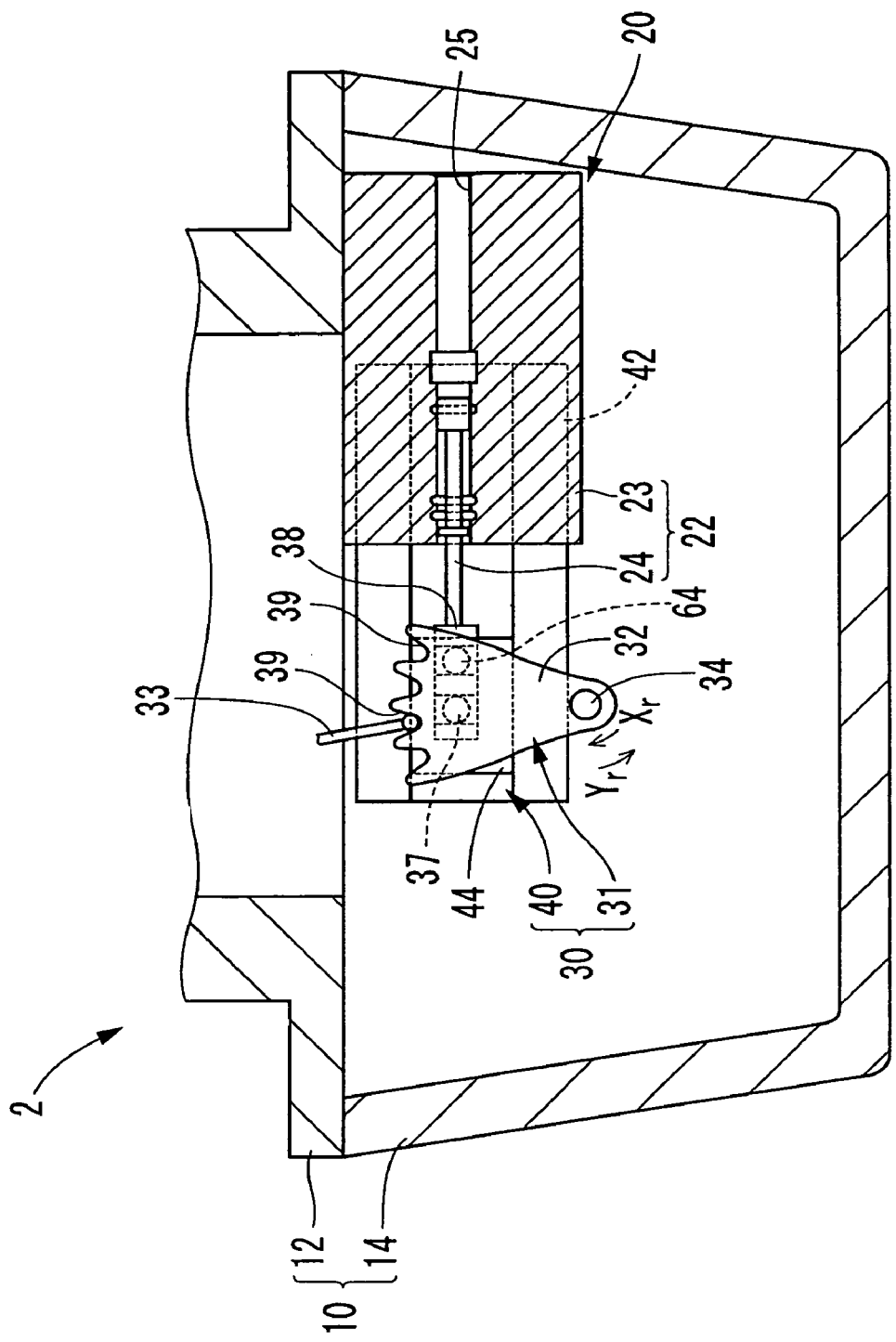
FIG. 2 is a cross sectional view showing an automatic transmission according to the first embodiment.

FIG. 2 shows an automatic transmission 2 according to a first embodiment of the present invention. The vehicular automatic transmission 2 includes a housing 10, an oil pressure controller 20, and a range detector 30.

The housing 10 is comprised of a transmission case 12 and an oil pan 14. The transmission case 12 accommodates a plurality of friction elements (not shown) which engage or disengage according to an oil pressure supplied from the oil pressure controller 20. The rage of the transmission 2 is changed based on a combination of engagement and disengagement of the friction elements. The transmission 2 of the first embodiment has parking range (P-range), reverse range (R-range), neutral range (N-range) and driving range (D-range). The oil pan 14 reserves an operation oil therein. The oil pan 14 accommodates the oil pressure controller 20 and the range detector 30.

Figure 3:
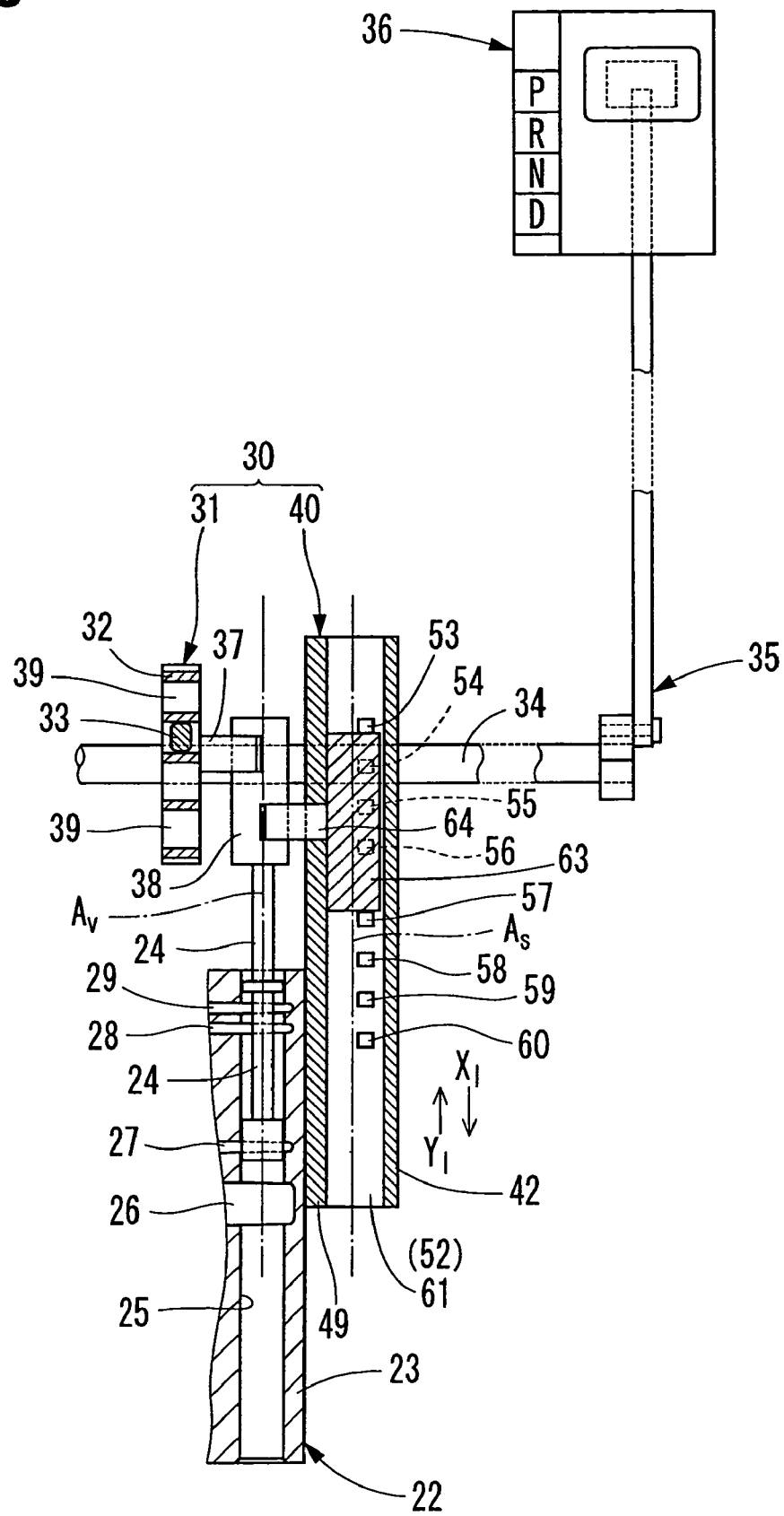
FIG. 3 is a partial cross sectional view showing an automatic transmission according to the first embodiment.
Figure 4:
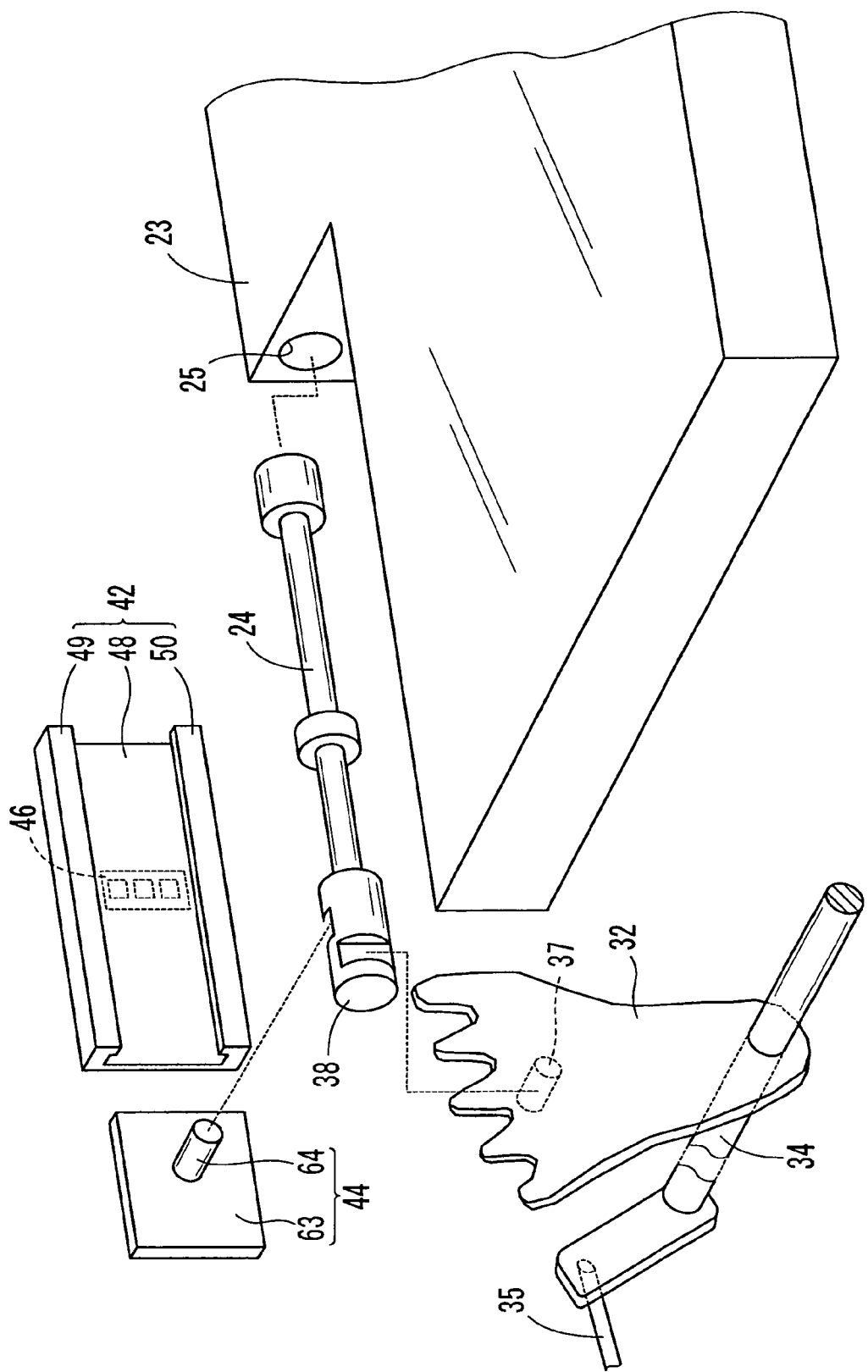
FIG. 4 is a perspective exploded view showing an automatic transmission according to the first embodiment.

The oil pressure controller 20 includes a plurality of valve, such as a manual valve 22, and a plurality of oil passages. As shown in FIGS. 2 to 4, the manual valve 22 includes a spool 24 inserted in a valve body 23. The valve body 23 fixed on the transmission case 12 is provided with a spool hole 25 which reciprocatably supports the spool 24. As shown in FIG. 3, the spool hole 25 is provided with a D-range port 26, a line port 27, a R-range port 28, and a drain port 29 in this series from one end to the other end thereof. The line port 27 communicates with oil passages which is connected to a pump or valves generating a line pressure. The D-range port 26 communicates with the oil passage which is connected to valves adjusting an oil pressure supplied to the friction elements in the D-range. The R-range port 28 communicates with the oil passage which is connected to valves adjusting an oil pressure supplied to friction elements in the R-range. The valves connected to the D-range port 26 and the R-range port 28 adjust the oil pressure by using the line pressure as an original pressure. The drain port 29 and the end of the spool hole 25 communicate with the oil pan 14.

Figure 5A:
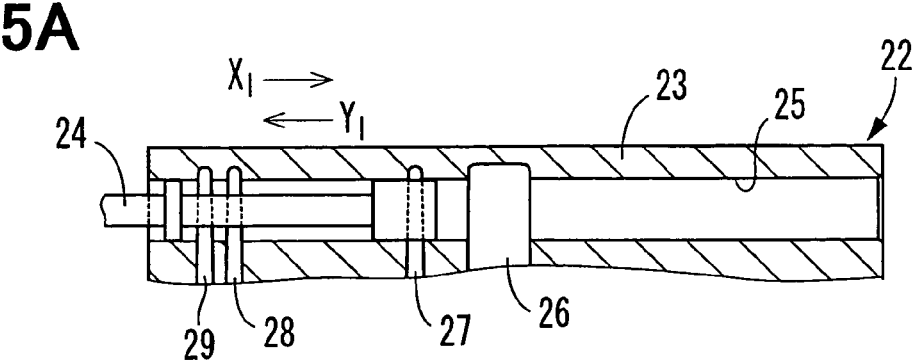
FIGS. 5A to 5D are cross sectional view for explaining an operation of a manual valve according to the first embodiment.
Figure 5B:
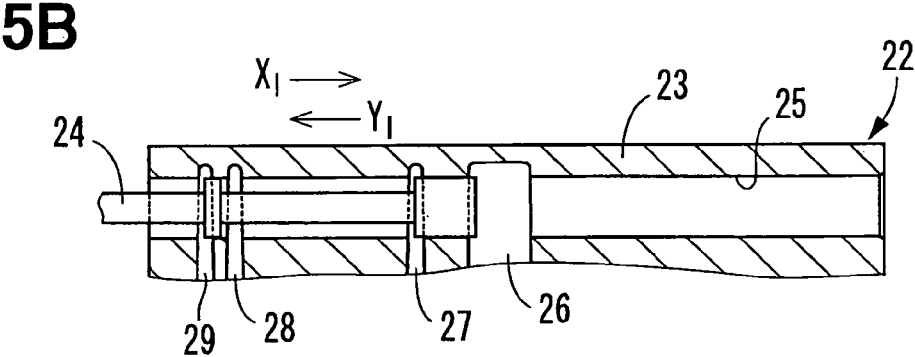
Figure 5C:
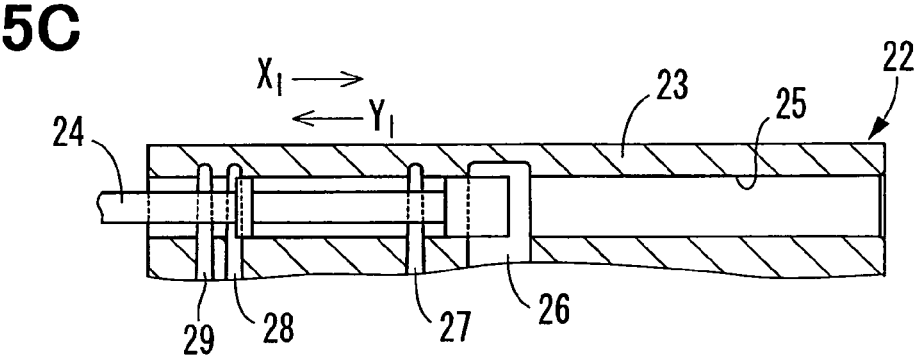
Figure 5D:
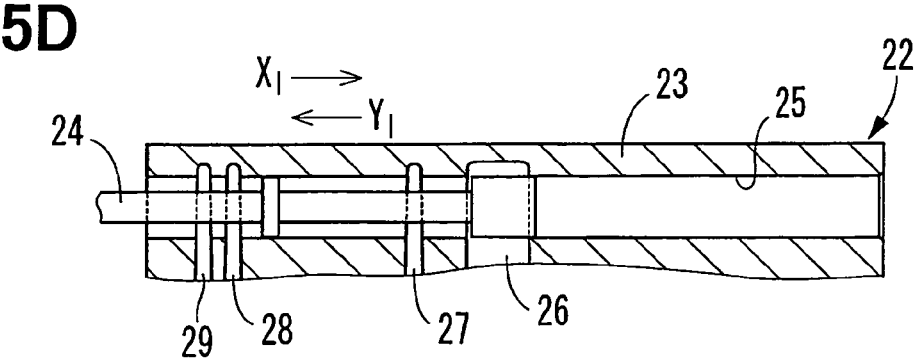

Each of ports 26-29 is opened/closed according to the position of the spool 24 to change the range of the automatic transmission 2. When an operator manipulates a range selector 36 to select P-range, the spool 24 is moved to P-position as shown in FIG. 5A in which the line port 27 is shut off from the other ports 26, 28, and 29 so that the line pressure is not supplied to the D-range port 26 and the R-range port 28. When the operator manipulates the range selector 36 to select R-range, the spool 24 is moved to R-position as shown in FIG. 5B. The line port 27 communicates with the R-range port 28 so that the line pressure is supplied to the R-range port 28. When the operator manipulates the range selector 36 to select N-range, the spool is moved to N-position as shown in FIG. 5C. The line port 27 is shut off from the other port 26, 28, and 29 so that the line pressure is not supplied to D-range port 26 and the R-range port 28. When the operator manipulates the range selector 36 to select D-range, the spool 24 moves to D-position as shown in FIG. 5D. The line port 27 communicates with the D-range port 26 to supply the line pressure to the D-range port 26. When the spool 24 moves in a direction $X_1$, each of P-range, R-range, N-range, and D-range is established in this series. When the spool 24 moves in a reverse direction $T_1$, each of the ranges is established in a reverse series.

As shown in FIGS. 2 and 3, the range detector 30 includes a detent mechanism 31 and an inhibiter switch 40.

The detent mechanism 31 includes a detent plate 32 and a detent spring 33. The detent plate 32 is provided with a rotational shaft 34 that vertically elongates from a flat surface of the detent plate 32. The rotational shaft 34 is supported by the oil pan 14 so that the detent plate 32 can be rotates around the rotational shaft 34. The rotational shaft 34 is connected with the range selector 36 through a link mechanism 35. The range selector 36 is a select lever which can be positioned at any one of P-range, R-range, N-range, and D-range.

The detent plate 32 is arranged in parallel with the axis line $A_v$ of the spool 24 and is provided with an output shaft 37 that vertically elongates from the flat surface of the detent plate 32. The output shaft 37 is engaged with one end 38 of the spool 21 which protrudes from the spool hole 25. The detent plate 32 swings according to the position of the range selector 36 in order to reciprocate the spool 24. When the P-range, the R-range, the N-range, and the D-range are selected in this series, the detent plate 32 rotates in a direction of $X_r$ to move the spool 24 in a direction of $X_l$. When the range is selected in the reverse series, the detent plate 32 rotates in a direction of $Y_r$ to move the spool 24 in a direction of $Y_l$.

The detent plate 32 is provided with a plurality of grooves 39 on its outer peripheral. A detent spring 33 is engaged with one of the grooves 39 according to the position of the detent plate 32 so that the detent plate 32 is prevented from rotating when the rage selector 36 is not manipulated.

Figure 6:
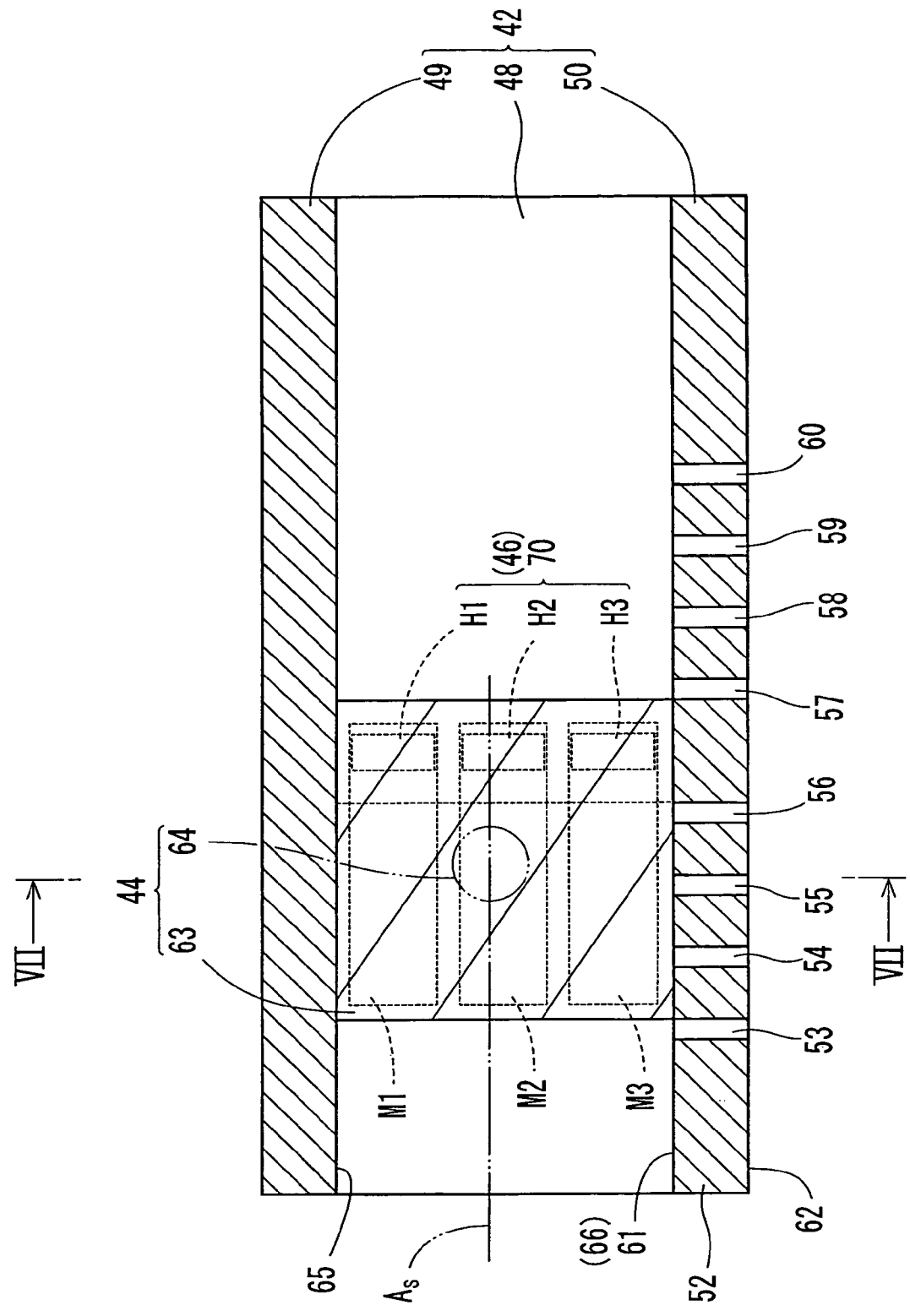
FIG. 6 is a cross sectional view showing an inhibiter switch according to the first embodiment.
Figure 7:
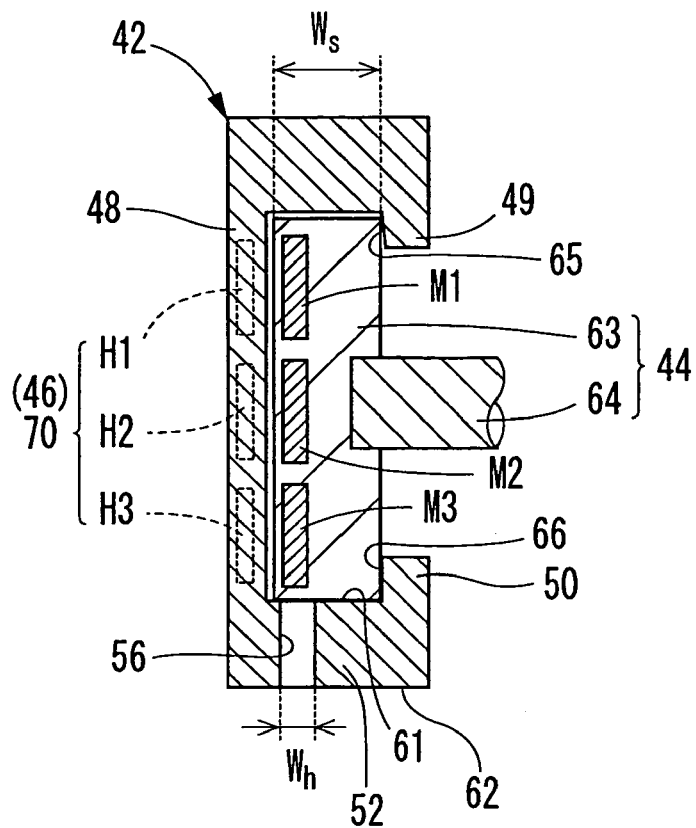
FIG. 7 is a cross sectional view taken along a line VII-VII of FIG. 6.

As shown in FIGS. 2 to 4, the inhibiter switch 40 includes a guide portion 42, a moving portion 44, and a detecting portion 46. The guide portion 42 is fixed on the transmission case 12 through the valve body 23. As shown in FIGS. 6 and 7, the guide portion 42 includes a base 48 and guide rails 49, 50. The base 48 is plate-like shaped and is arranged in parallel with the axis line $A_v$ of the spool 24. In this embodiment, when the vehicle equipped with the automatic transmission 2 is on a horizontal plane, the base 48 is substantially vertical to the horizontal plane. It is supposed that the up-and-down direction in FIGS. 6 and 7 corresponds to vertical direction hereinafter.

An upper guide rail 49 is provided on an upper portion of the base 48, and the lower guide rail 50 is provided on the lower portion of the base 48. The upper and lower rails 49, 50 extend in parallel with the axis line $A_v$, and have U-shaped cross section which is vertical to the axis line $A_v$. A bottom wall 52 of the lower guide rail 50 is provided with a plurality of through holes 53-60. The cross-section of the holes 53-60 is rectangular. An upper surface 61 of the wall 52 is a sliding surface on which the moving portion 44 slides. The upper ends of the holes 53-60 are upwardly opened, and the lower ends of the holes 53-60 are opened on the lower surface 62 of the bottom wall 52. The lower end of the holes 53-60 communicate with an interior of the oil pan 14.

As shown in FIG. 3, the moving portion 44 includes a slider 63 and an input shaft 64. The slider 63 is plate-like shaped and is arranged in parallel with the axis line $A_v$ and the base 48. An upper portion of the slider 63 is engaged with the upper rail 49, and lower portion of the slider 63 is engaged with the lower rail 50. Thus, the slider 63 is slidablly supported between the upper and the lower rail 49, 50. The upper surface of the slider 63 is slidablly in contact with a lower surface 65 of the upper rail 49, and the lower surface of the slider 63 is slidablly in contact with the upper surface 61 of the lower rail 50. The width Ws of the slider 63 is greater than the width Wh of the holes 53-60. Thus, the edge of the moving portion 44 cannot be engaged with the holes 53-60.

Figure 8:
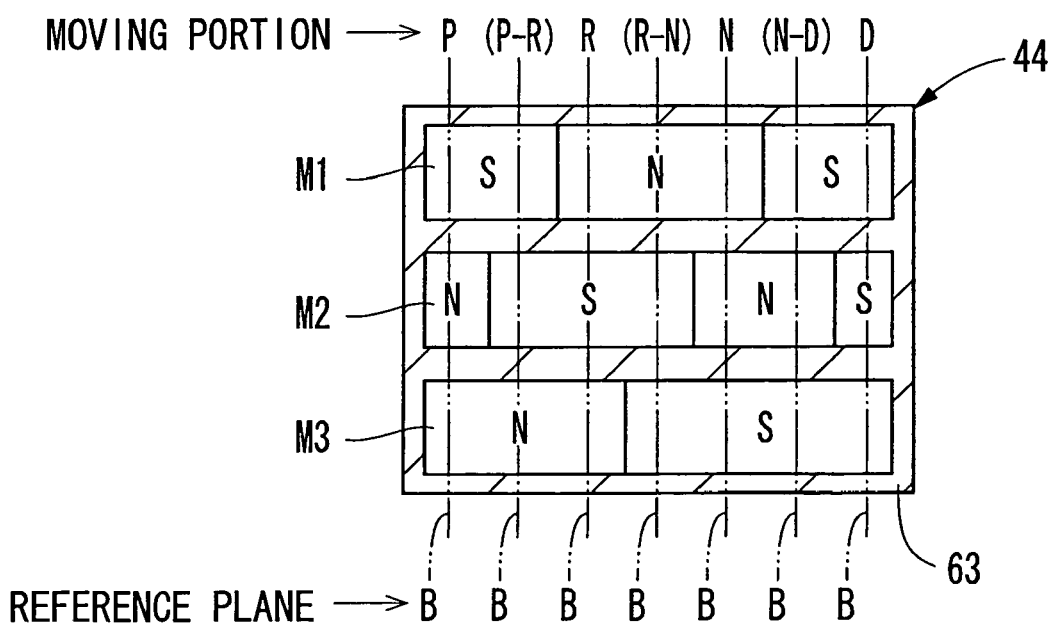
FIG. 8 is a schematic cross sectional view showing a moving portion of an inhibiter switch according to the first embodiment.

Three magnet patterns M1, M2, M3 are embedded in the slider 63. Three magnet patterns M1, M2, M3 are aligned in a vertical direction, and each of them extends along an axial line $A_s$. The magnetic poles of the magnet patterns M1, M2, M3 are arranged in a moving direction of the slider 63 as shown in FIG. 8.

As shown in FIG. 3, the input shaft 64 elongates vertically to the flat surface of the slider 63 and is engaged with the end portion 38 of the spool 24, whereby the moving portion 44 is reciprocated in synchronization with the spool 24 according to the position of the range selector 36. When the range selector 36 in the P-range, the moving portion 44 is positioned in a position shown in FIG. 1A. When in the R-range, the moving portion 44 is positioned in a position shown in FIG. 1B. When in the N-range, the moving portion 44 is positioned in a position shown in FIG. 1C. When in the D-range, the moving portion 44 is positioned in a position shown in FIG. 1D.

Figure 1A:
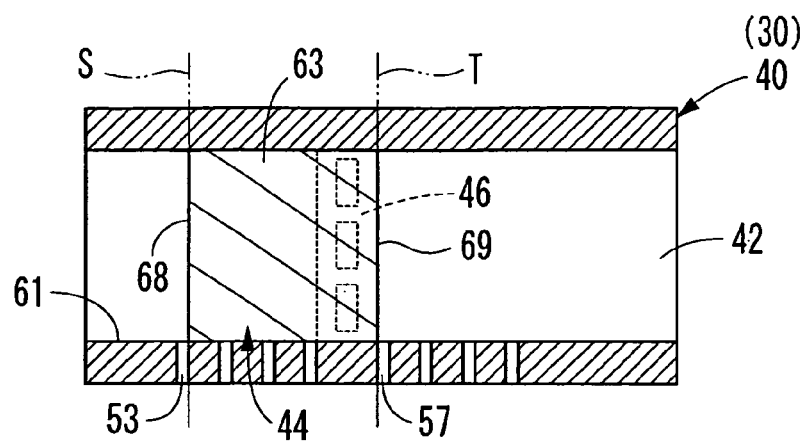
FIGS. 1A to 1D are cross sectional views for explaining an operation of an inhibiter switch according to a first embodiment of the present invention.
Figure 1B:
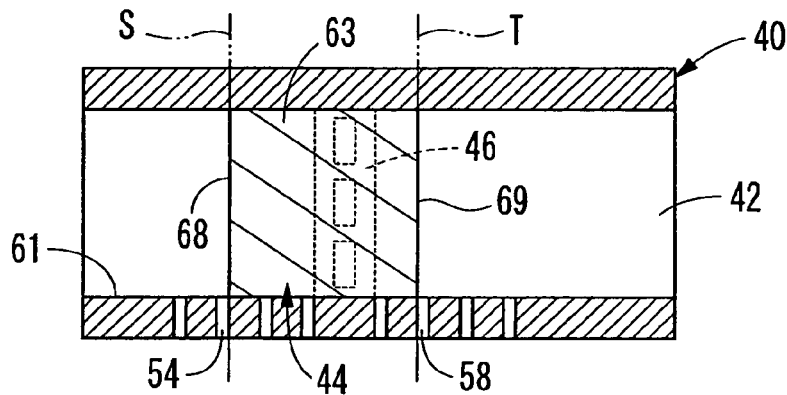
Figure 1C:
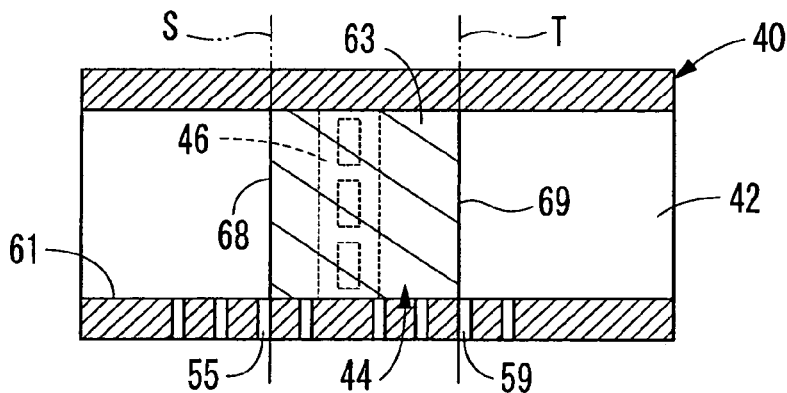
Figure 1D:
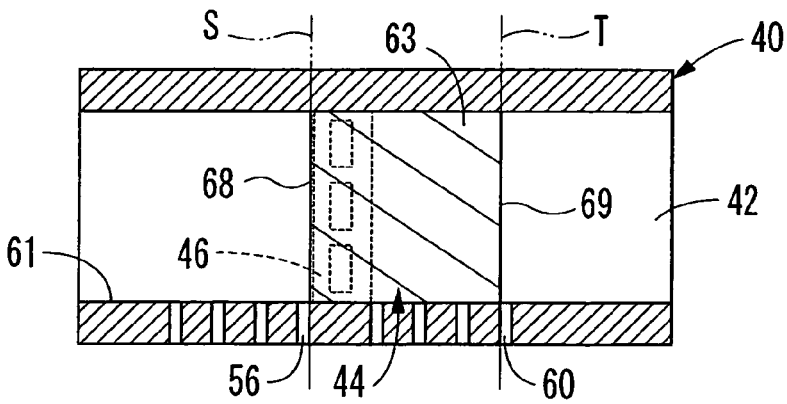

When the moving portion 44 is positioned in the position shown in FIG. 1A, phantom planes S, T which are in contact with sidewalls 68, 69 of the slider 63 are close to the holes 53, 57. When the moving portion 44 is positioned in the position shown in FIG. 1B, the phantom planes S, T are close to the holes 54, 58. When the moving portion 44 is positioned in the position shown in FIG. 1C, the phantom planes S, T are close to the holes 55, 59. When the moving portion 44 is positioned in the position shown in FIG. 1D, the phantom planes S, T are close to the holes 56, 60.

Figure 9:
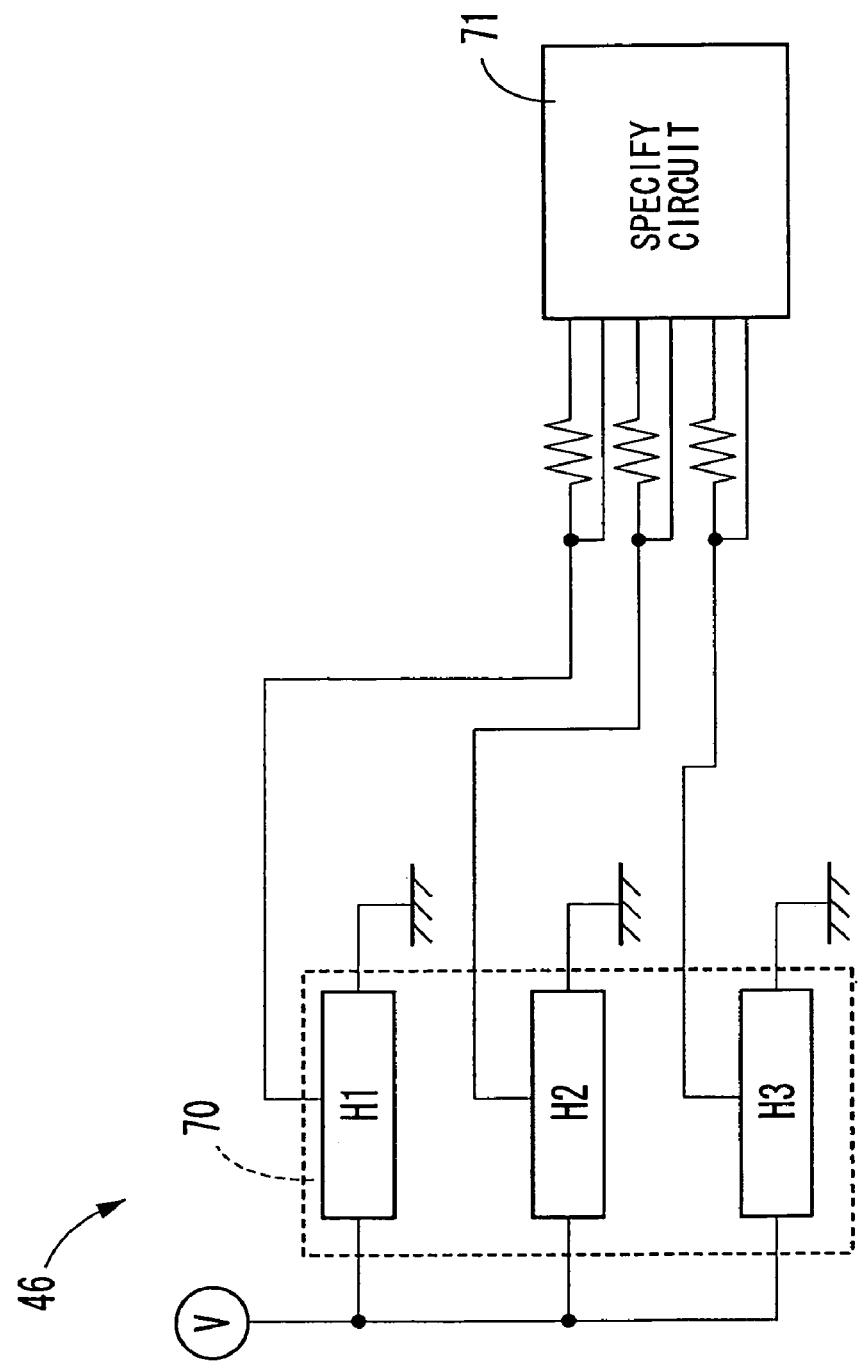
FIG. 9 is a block diagram showing a detecting portion of the inhibiter switch according to the first embodiment.
Figures 10, 11:
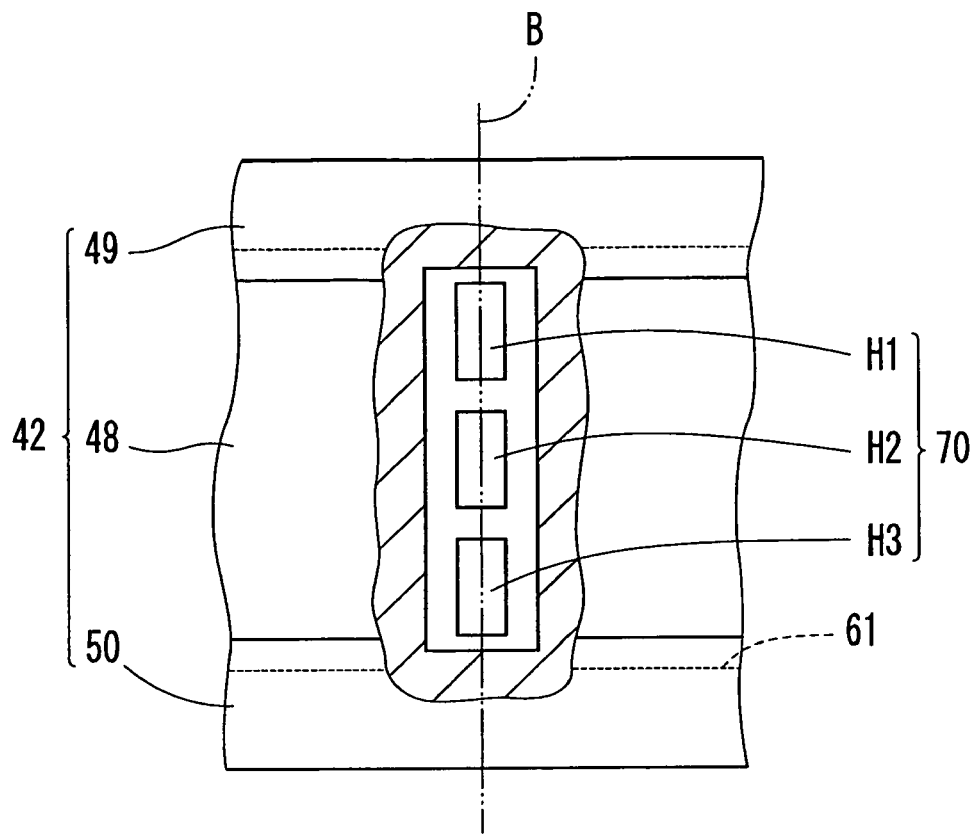
FIG. 10 is a partial cross sectional view showing a guide portion and a detecting portion of the inhibiter switch according to the first embodiment.
FIG. 11 is a diagram for explaining an operation of the inhibiter switch according to the first embodiment.

As shown in FIG. 9, the detecting portion 46 includes position sensors 70 and a specifying circuit 71 which are connected with each other. As shown in FIG. 10, the position sensor 70 is embedded in the base 48 and includes three Hall effect elements H1, H2, H3. Three Hall effect elements H1, H2, H3 are aligned on a reference phantom plane B which is vertical to the axis line $A_s$. As shown in FIG. 7, each of Hall effect elements H1, H2, H3 respectively confront the magnetic pattern M1, M2, M3 in a horizontal direction. When the magnetic pole of the magnetic pattern M1, M2, M3 on the reference phantom plane B is the South pole, the Hall effect elements H1, H2, H3 are turned on. When the magnetic pole is the North pole, the Hall effect elements H1, H2, H3 are turned off. As shown in FIG. 8, the magnetic pattern M1, M2, M3 on reference phantom plane B are formed in such a manner that a combination of the magnetic pole are varied according to the position of the moving portion 44. Thus, a combination of the output of the Hall effect elements H1, H2, H3 is varied according to the position of the moving portion 44 as shown in FIG. 11. The output of the Hall effect elements H1, H2, H3 represents the position of the moving portion 44.

The specifying circuit 71 includes a microcomputer which detects the range of the transmission based on the outputs of the Hall effect elements H1, H2, H3. Since, the combination of the magnetic pole of the magnetic pattern M1, M2, M3 on the reference phantom plane B is varied according to the position of the moving portion 44, the specifying circuit detects the combination of the magnetic pole to specify the range of the transmission.

The particles contaminating the operation oil tend to adhere on the upper surface 61 of the lower rail 50. According to the first embodiment, since the slider 63 slides on the upper surface 61, the adhering particles on the upper surface are scraped by the slider 63. The scraped particles drop into the oil pan 14 through the holes 53-60. Thus, the sediments of particles on the upper surface 61 are restrained, so that the moving portion 44 moves smoothly. The breakage of the moving portion 44 and the guide portion 42, and malfunction of the inhibiter switch 40 can be avoided. Since the operation oil in the oil pan 14 flows through the holes 53-60, the clog of the particles in the holes 53-60 can be avoided.

Second Embodiment

FIG. 12A to 12D show a second embodiment of the present invention. The same parts and components as those in the first embodiment are indicated with the same reference numerals and the same descriptions will not be reiterated.

Figure 12A:
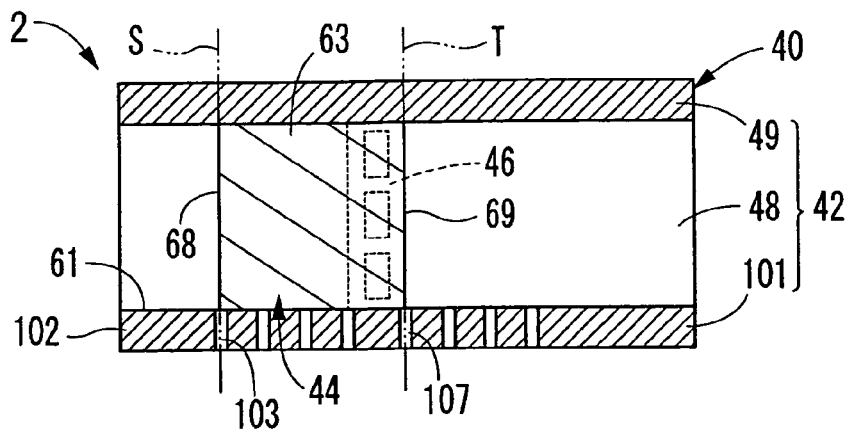
FIG. 12A to 12D are cross sectional views for explaining an operation of an inhibiter switch according to a second embodiment.
Figure 12B:
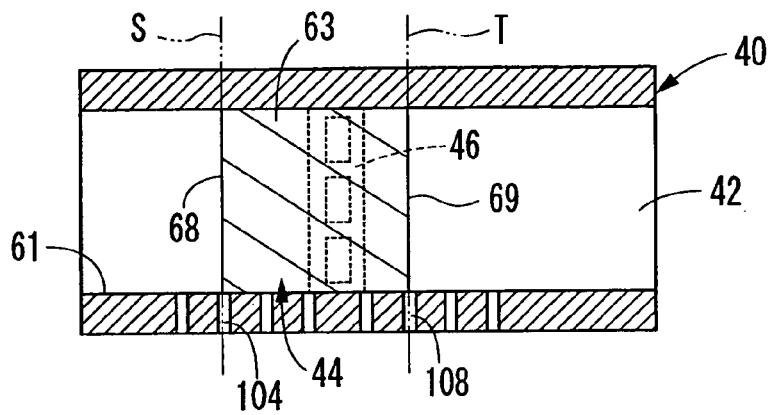
Figure 12C:
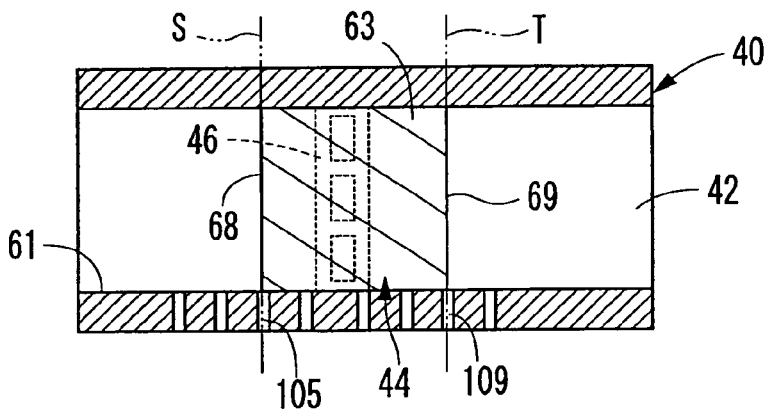
Figure 12D:
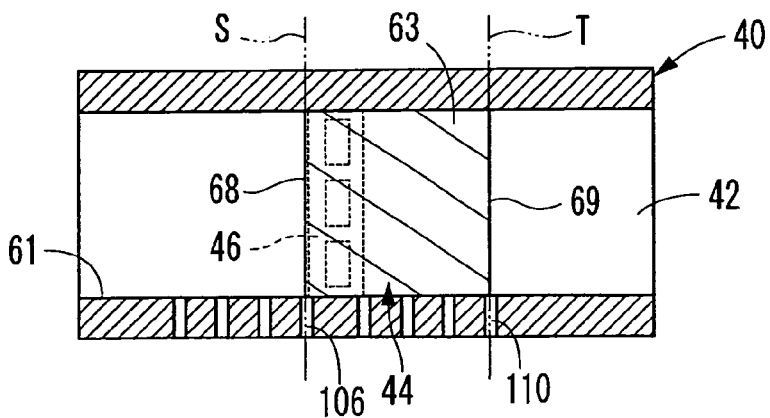

In the second embodiment, holes 103-110 are provided at intervals different from the first embodiment. FIG. 12A shows the time when the moving portion 44 is positioned at the P-range position in which the phantom planes S, T are on the hole 103 and 107. When the moving portion 44 is positioned at the R-range position, the phantom planes S, T are on the hole 104 and 108 as shown in FIG. 12B. When the moving portion 44 is positioned at the R-range position, the phantom planes S, T are on the holes 105 and 109 as shown in FIG. 12C. When the moving portion 44 is positioned at the D-range position, the phantom plane S, T are on the hole 106, 110 as shown in FIG. 2D. Thus, the particles on the upper surface 61 are scraped by the slider 63. The scraped particles drop into the oil pan 14 through the holes 103-110.

Third Embodiment

FIGS. 13A to 13D and FIG. 14 show the third embodiment of the present invention. The same parts and components as those in the first embodiment are indicated with the same reference numerals and the same descriptions will not be reiterated.

A bottom wall 152 of a lower rail 151 is provided with a communication hole 160. The communication hole 160 includes a groove 161 and a plurality of through holes 163-170. The groove 161 is opened on the upper surface 61 and extends whole of the lower rail 151 along the axis line $A_s$. The length of the groove 161 is longer than a moving length of the moving portion 44 in the axis line $A_s$. The width of the groove 161 is narrower than that of the moving portion 44.

Figure 13A:
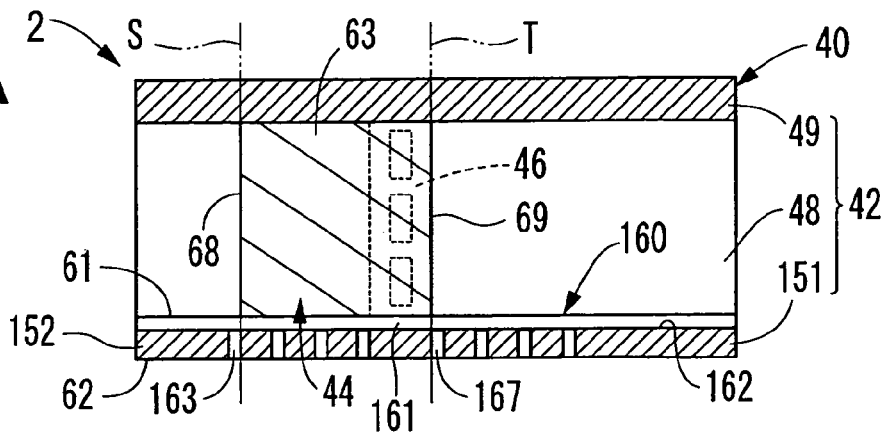
FIG. 13A to 13D are cross sectional views for explaining an operation of an inhibiter switch according to a third embodiment.
Figure 13B:
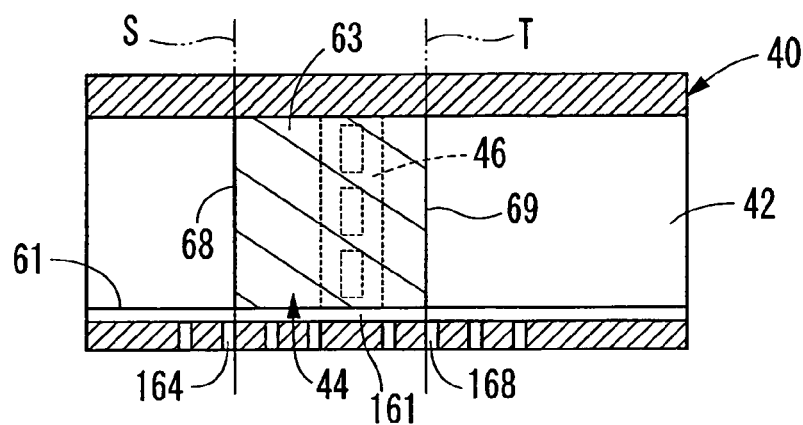
Figure 13C:
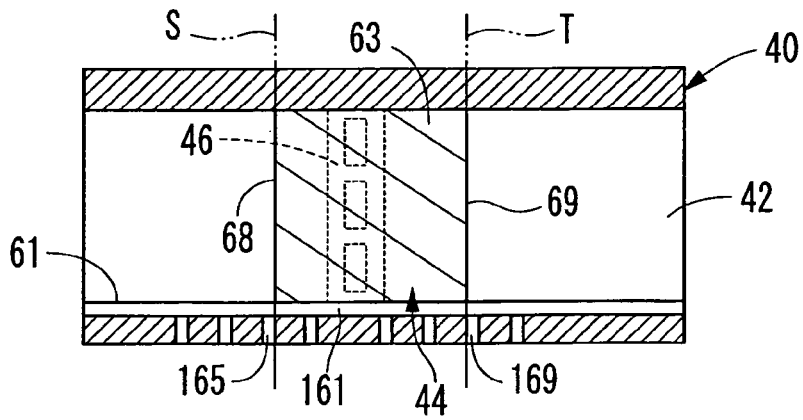
Figure 13D:
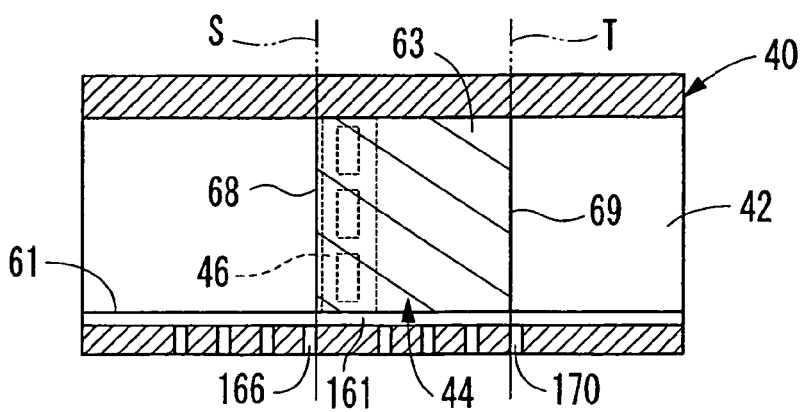
Figure 14:
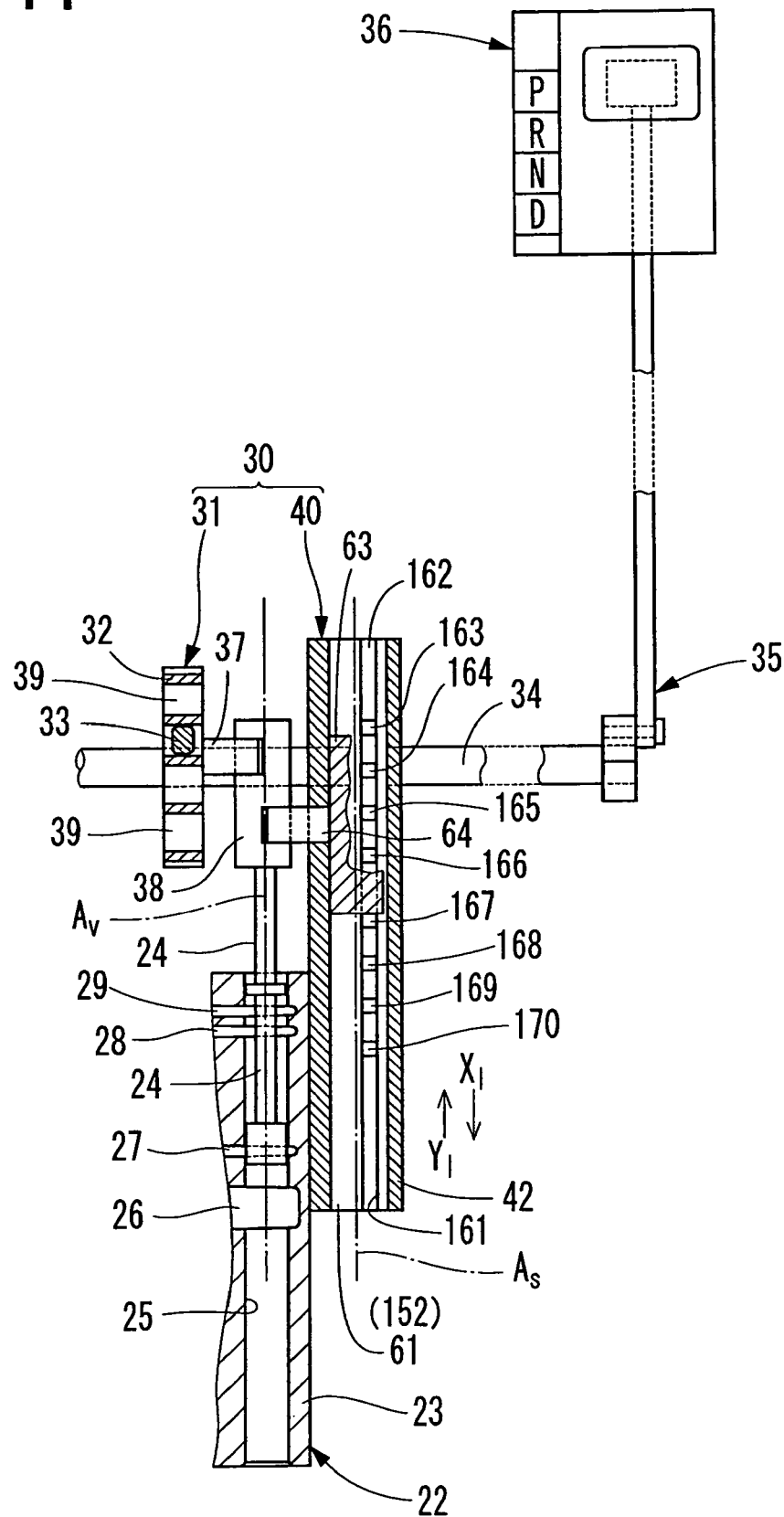
FIG. 14 is a partial cross sectional view showing an automatic transmission according to the third embodiment.

FIG. 13A shows that the moving portion 44 is positioned in the P-range position. FIG. 13B shows that the moving portion 44 is positioned in the R-range position. FIG. 13C shows that the moving portion 44 is positioned in the N-range position. FIG. 13D shows that the moving portion 44 is positioned in the D-range position.

The particles on the upper surface 61 are scraped by the slider 63. The scraped particles drop into the groove 161 to prevent the moving portion 44 from being stuck.

Fourth Embodiment

Figure 15A:
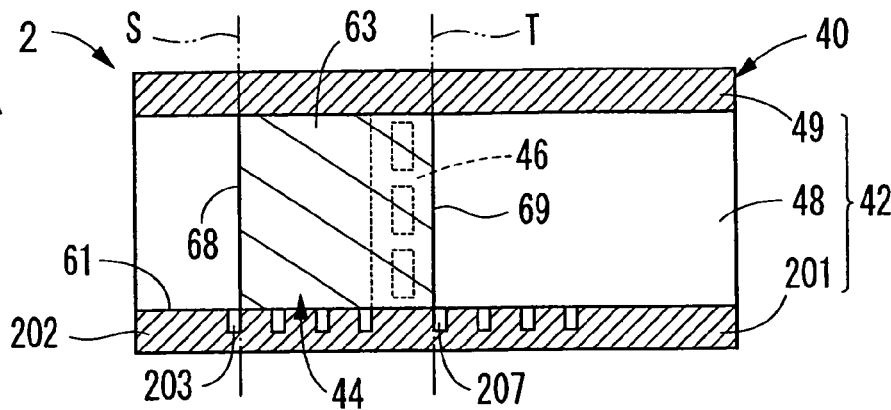
FIG. 15A to 15D are cross sectional views for explaining an operation of an inhibiter switch according to a fourth embodiment.
Figure 15B:
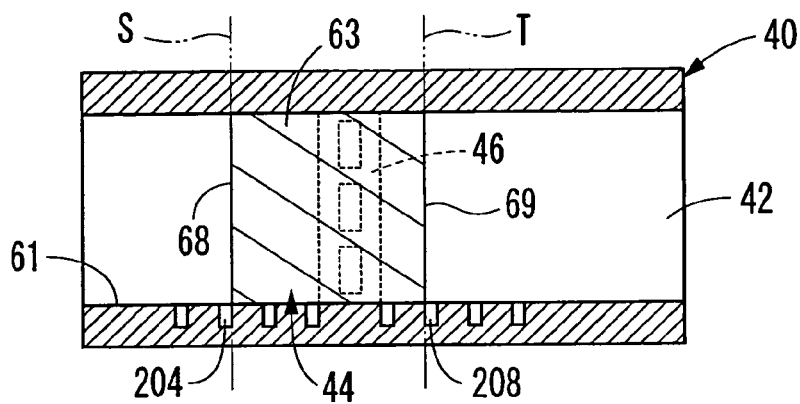

FIGS. 15A to 15B shows a fourth embodiment of the present invention. The same parts and components as those in the first embodiment are indicated with the same reference numerals and the same descriptions will not be reiterated.

A bottom wall 202 of a lower rail 201 is provided with holes 203-210, each of which has bottom. The holes 203-210 are not through holes.

Figure 15C:
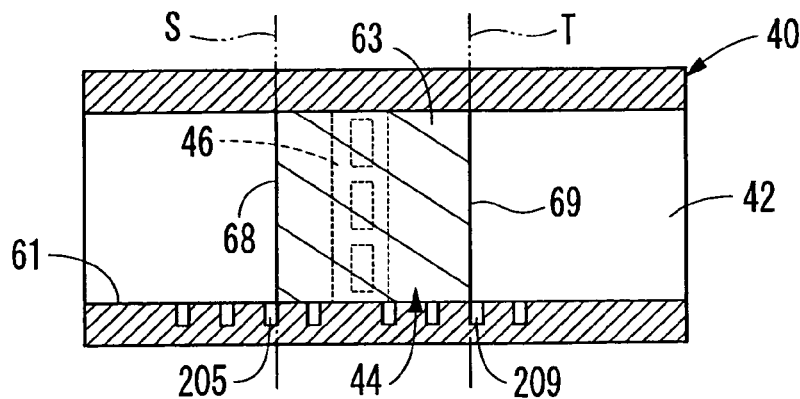
Figure 15D:
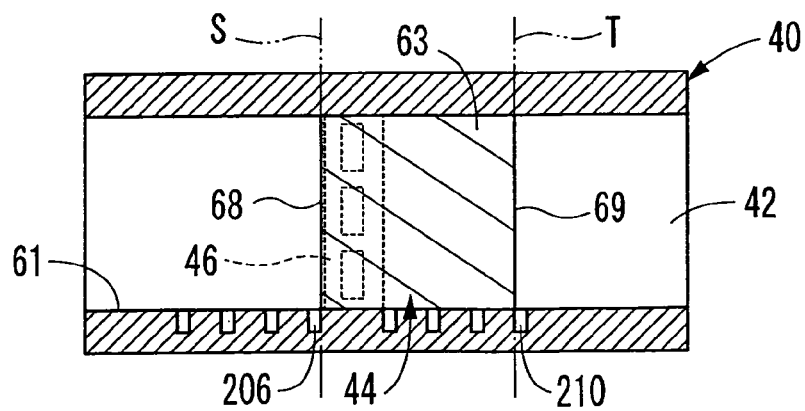

FIG. 15A shows that the moving portion 44 is positioned in the P-range position. FIG. 15B shows that the moving portion 44 is positioned in the R-range position. FIG. 15C shows that the moving portion 44 is positioned in the N-range position. FIG. 15D shows that the moving portion 44 is positioned in the D-range position.

The particles on the upper surface 61 are scraped by the slider 63. The scraped particles drop into the holes 203-210 to prevent the moving portion 44 from being stuck.

Fifth Embodiment

Figure 16:
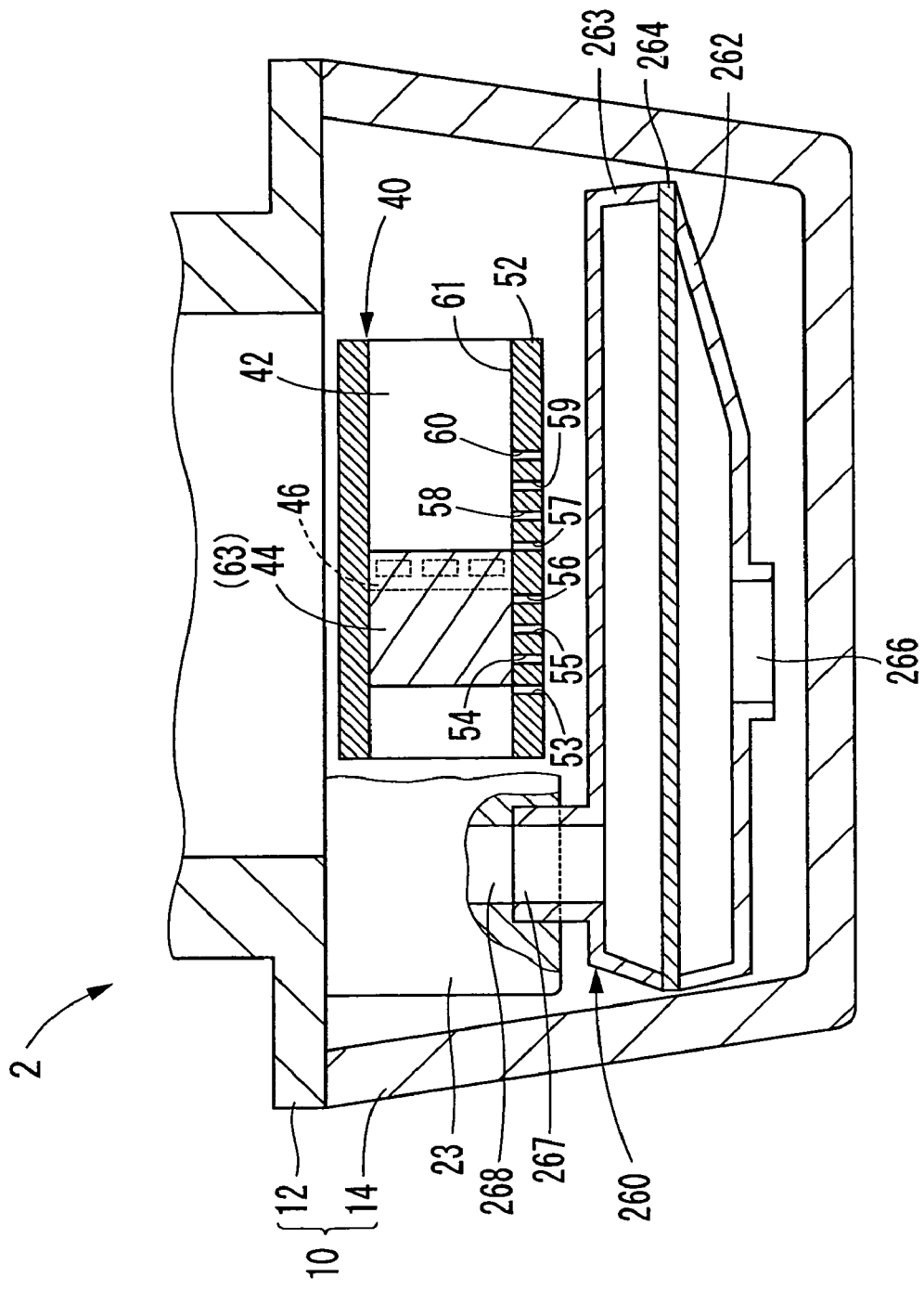
FIG. 16 is a cross sectional view showing an automatic transmission according to a fifth embodiment.

FIG. 16 shows a fifth embodiment of the present invention. The same parts and components as those in the first embodiment are indicated with the same reference numerals and the same descriptions will not be reiterated.

A filter 260 is provided in the oil pan 14. The filter 260 includes cases 262 and 263, a filter element 264, and an oil pump (not shown). The dusty-side case 262 and the clean-side case 263 are cup-shaped. Both cases are combined with each other through the filter element 264. The dusty-side case 262 is provided with an inlet 266 communicating with the interior of the oil pan 14. The operation oil in the oil pan 14 flows into the interior of the dusty-case 262 through the inlet 266. The filter element 264 is made from nonwoven fabric or filter paper, and filtrates the operation oil flowing from the dusty-side case 262 to clean-side case 263. The clean-side case 262 is provided with an outlet 267 which communicates with the inlet of the oil pump (not shown) through an oil passage 268 of the valve body 23. The operation oil passed through the filter element 264 is introduced into the oil pump through the outlet 267. The oil pump generates the line pressure. The particles expelled from the through holes 53-60 are filtered by the filter 260.

Sixth Embodiment

Figure 17:
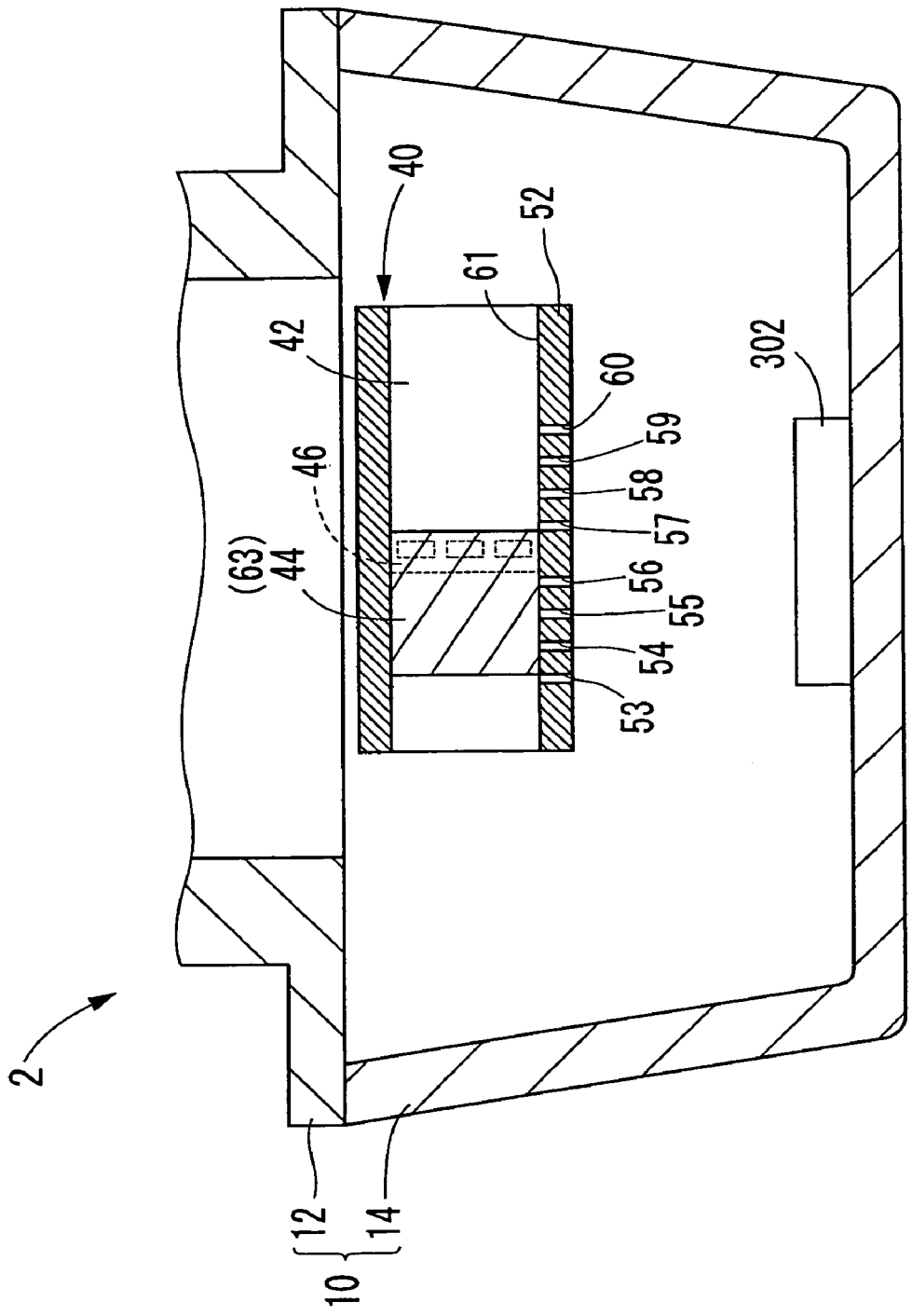
FIG. 17 is a cross sectional view showing an automatic transmission according to a sixth embodiment.

FIG. 17 shows a sixth embodiment of the present invention. The same parts and components as those in the first embodiment are indicated with the same reference numerals and the same descriptions will not be reiterated.

A permanent magnet 302 is disposed on the bottom of the oil pan 14 at the position under the through holes 53-60. The permanent magnet 302 attracts metal particles. Thus, it is restricted that the metal particles adhere to the upper surface 61 again.

Seventh Embodiment

Figure 18:
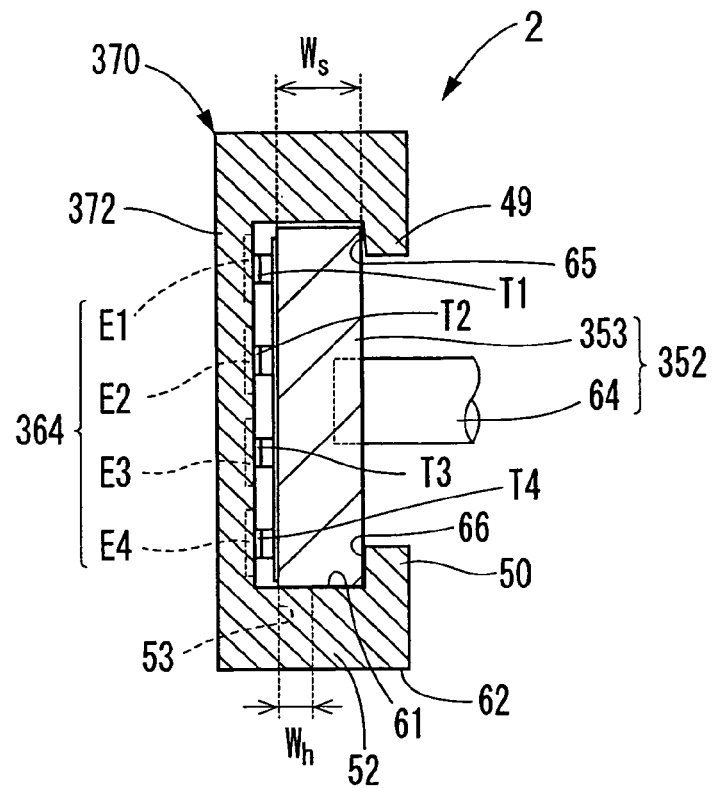
FIG. 18 is a cross sectional view showing an inhibiter switch according to a seventh embodiment.

FIG. 18 shows a seventh embodiment of the present invention. The same parts and components as those in the first embodiment are indicated with the same reference numerals and the same descriptions will not be reiterated.

Figure 19A:
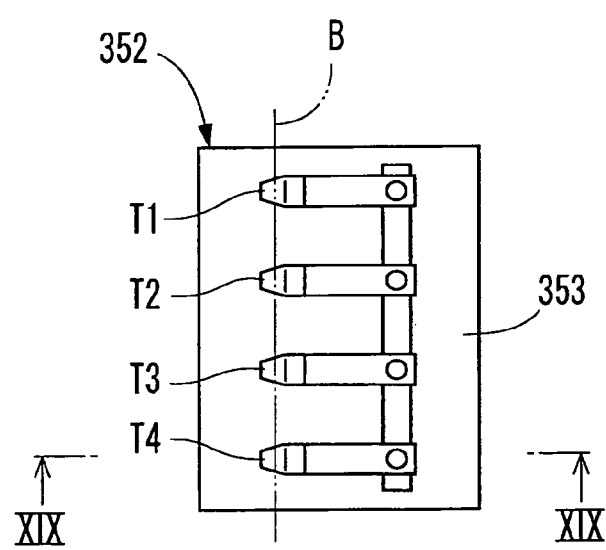
FIG. 19A is a plain view showing a moving portion of an inhibiter switch according to the seventh embodiment.
Figure 19B:
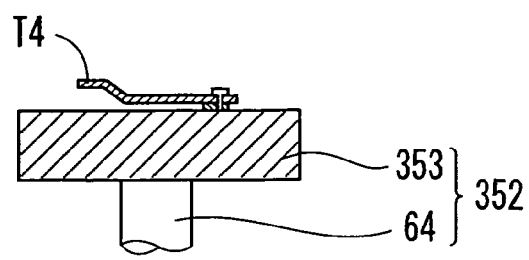
FIG. 19B is a cross sectional view taken along a line XIX-XIX of FIG. 19A.

As shown in FIGS. 18, 19A and 19B, four terminals T1, T2, T3, and T4 are provided on the slider 353 of the moving portion 352. Each of the terminals T1, T2, T3, and T4 are fixed on the slider 353 at regular intervals in a vertical direction. One end of each terminal T1, T2, T3, and T4 is respectively arranged on the reference phantom plane B.

Figure 20:
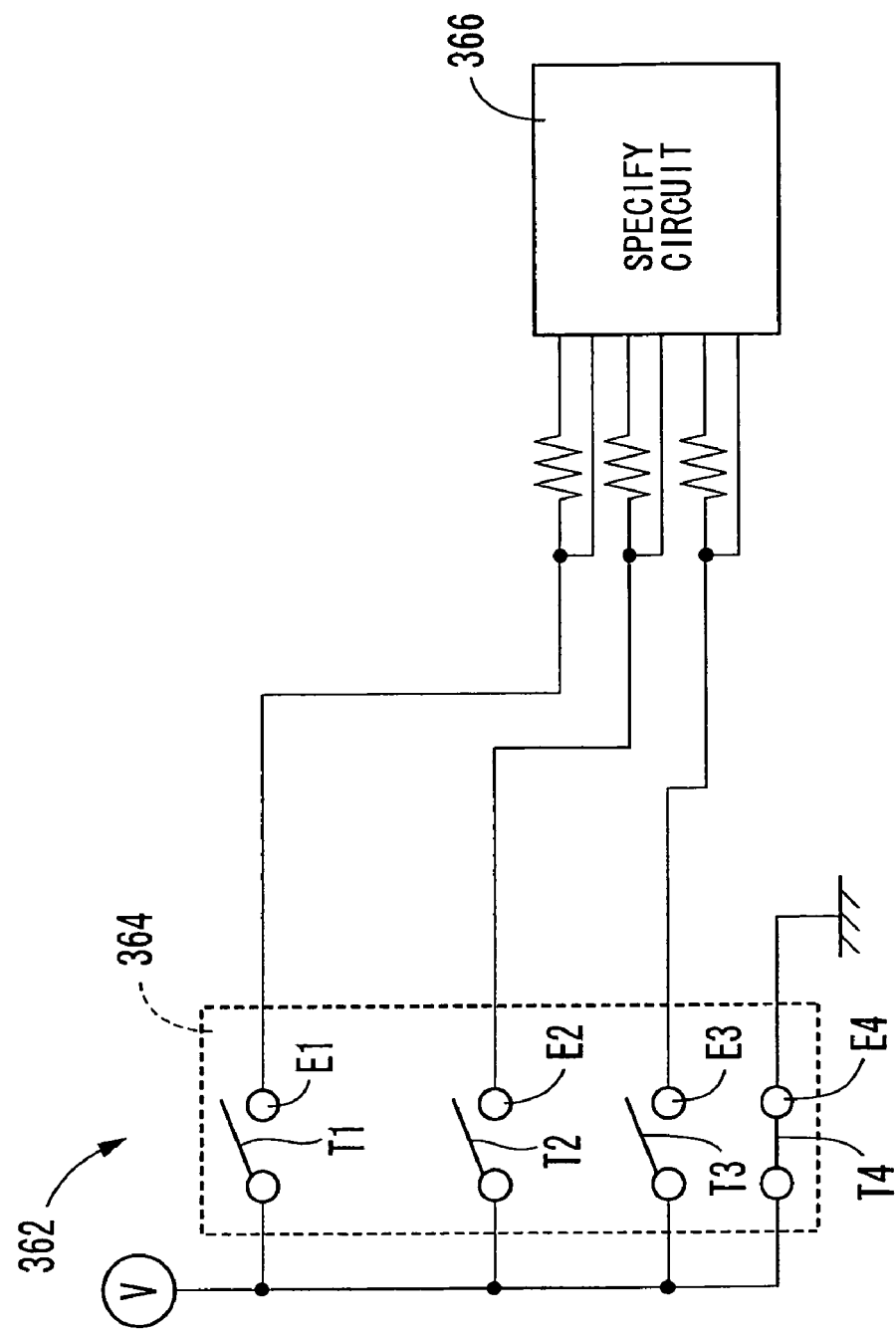
FIG. 20 is a block diagram showing a detecting portion of an inhibiter switch according to the seventh circuit.
Figures 21, 22:
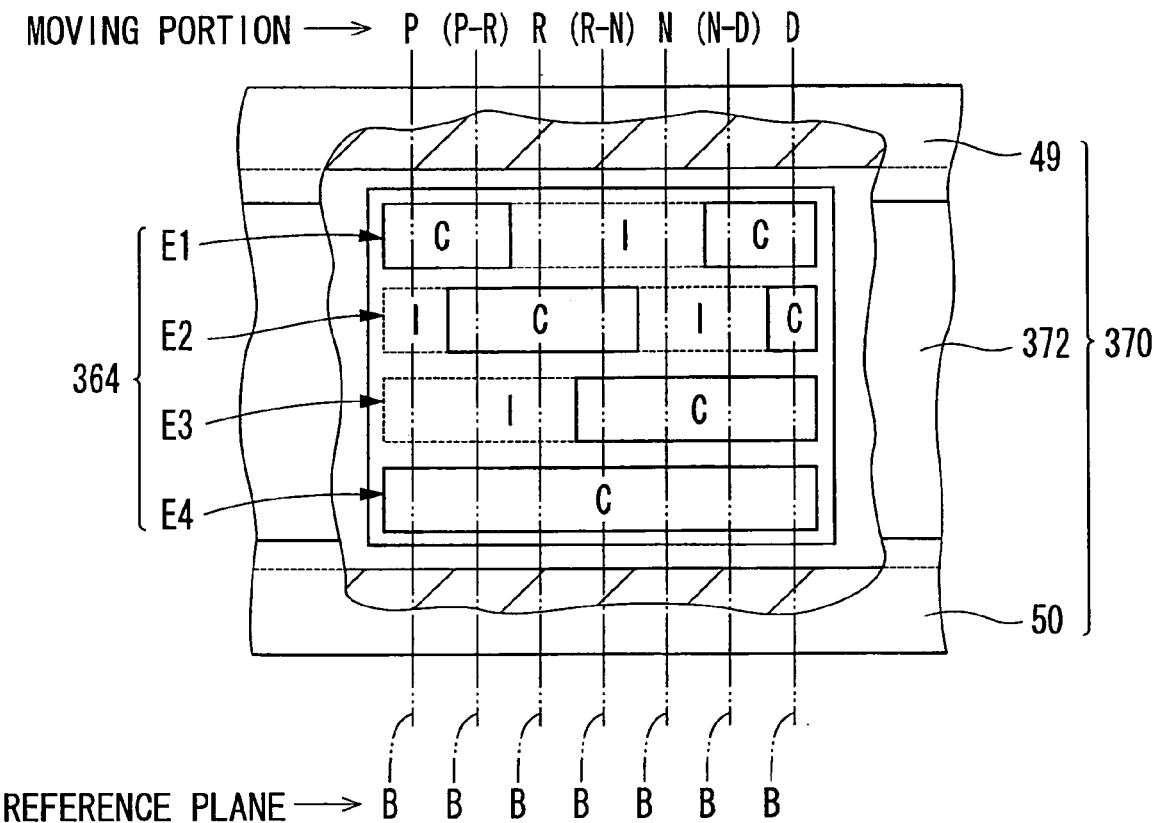
FIG. 21 is a partial cross sectional view showing a guide portion and a detecting portion of the inhibiter switch according to the seventh embodiment.
FIG. 22 is a diagram for explaining an operation of the inhibiter switch according to the seventh embodiment.

As shown in FIG. 20, the detector 362 includes a position sensors 364 and a specify circuit 366. The position sensors 364 are embedded in the base 372 of the guide portion 370. The moving portion 352 is in contact with the position sensor 364 to detect the position of the moving portion 352. The position sensor 364 includes four electrode patterns E1, E2, E3, and E4. Each of the electrode patterns E1, E2, E3, and E4 extend along the axis line As and is arranged in the vertical direction. Each of the electrode pattern E1, E2, and E3 includes a conductive portion C and an insulating portion I. These conductive portions C and insulating portions I are arranged as shown in FIG. 21. The electrode patterns E4 has only conductive portion C.

Each electrode pattern E1, E2, E3, and E4 can be in contact with each of the terminal T1, T2, T3, and T4 on the reference phantom plane. Each of the electrode patterns E1, E2, E3, and E4 is turned on when the corresponding electric terminal T1, T2, T3, and T4 is brought in contact with the conductive portion C. Each of the electrode patterns E1, E2, E3, and E4 is turned off when the corresponding electric terminal T1, T2, T3, and T4 is brought in contact with the insulating portion I. The electrode patterns E1, E2, E3, and E4 are arranged in such a manner that a combination of the conductive portion C and the insulating portion I is varied according to the position of the moving portion 352. Thus, the combination of output of each electrode pattern E1, E2, E3, and E4 is varied according to the position of the moving portion 352 as shown in FIG. 22.

The specify circuit 366 specify the range of the transmission based on the output of the electrode patterns E1, E2, E3, and E4.

Eighth Embodiment

Figure 23:
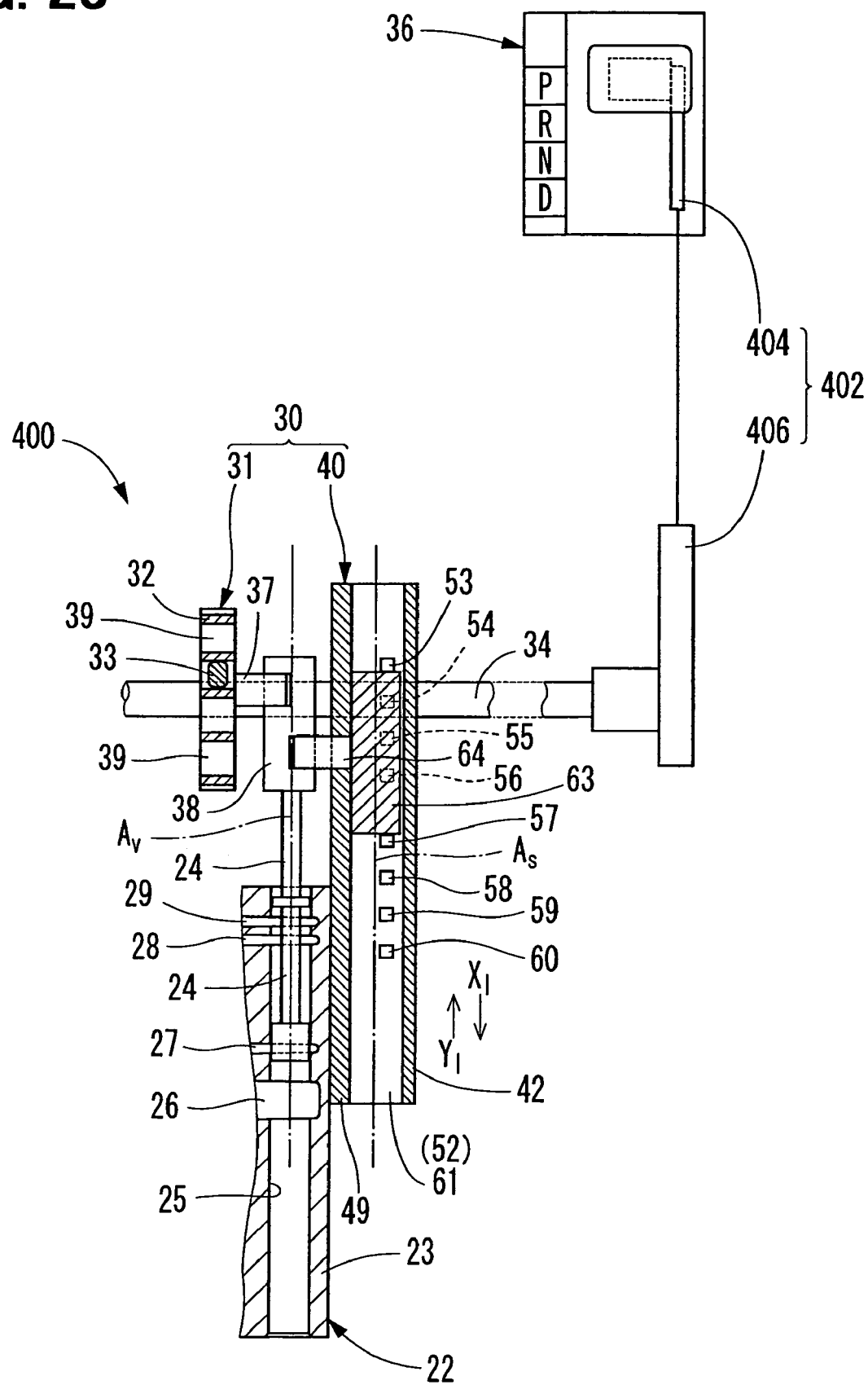
FIG. 23 is a partial cross sectional view showing an automatic transmission according to eighth embodiment.

FIG. 23 shows an eighth embodiment of the present invention. The same parts and components as those in the first embodiment are indicated with the same reference numerals and the same descriptions will not be reiterated.

The range selector 36 and the detent plate 32 are connected with each other by an electric wire system 402. The electric wire system 402 includes a selector sensor 404 and a shift actuator 406. The selector sensor 404 is attached to the range selector 36 in order to detect the rage position of the transmission. The selector sensor 404 is electrically connected with the shift actuator 406 and outputs a signal indicative of the position of the range. The shift actuator 404 includes a motor and a control circuit to intermittently rotate the detent plate 32 based on the outputted signal.

In the above embodiment, only at least one of most outside holes can be made. A frequency in which the moving portion 44, 352 is in P-range or D-range is relatively high. Thus, only most outside holes can expel the particles from the upper surface 61.

In the above embodiments, non-contacting sensors including magneto-resistance elements can be used instead of the Hall effect elements.

In the third to eighth embodiments, the interval of the holes 163-170, 203-210, 53-60 can be changed into the interval of the holes 103-110 of the second embodiment.

In the fifth to eighth embodiments, the holes 53-60 can be replaced by the hole 160 of the third embodiment or holes 203-210 of the fourth embodiment.

In the sixth to eighth embodiments, the filter 260 can be provided. The permanent magnet can be replaced by an electromagnet. In the seventh and eighth embodiments, a permanent magnet can be provided.

What is claimed is:

1. A range detector comprising:
a moving portion which reciprocates according to a range of an automatic transmission, the range of the automatic transmission being comprised of a parking range, a reverse range, a neutral range, and a driving range, the moving portion being positioned at one of a P-position, a R-position, a N-position, and a D-position, which respectively correspond to the parking range, the reverse range, the neutral range, and the driving range, when the respective range of the automatic transmission is selected;
a guide portion having a bottom sliding surface on which the moving portion reciprocates; and
a detecting portion supported by the guide portion to detect the range of the automatic transmission based on a position of the moving portion, wherein
a plurality of holes are formed in the bottom sliding surface,
the moving portion reciprocates over the plurality of holes,
the plurality of holes are formed in the bottom sliding surface of the guide portion so that said holes are respectively positioned adjacent to and aligned with front and rear ends of the moving portion when the moving portion is positioned at each of the P-position, R-position, N-position and D-position, allowing particulate matter to be dropped into the holes by at least one of gravity and selective alignment of the moving portion with the holes when the moving portion is positioned at any one of said P-position, R-position, N-position and D-position, the moving portion, the guide portion, and the detecting portion are accommodated in the automatic transmission, and the sliding surface is arranged in such a manner as to face upwardly.

2. The range detector according to claim 1, wherein
a groove is formed on the sliding surface and extends in a moving direction of the moving portion, the plurality of holes being formed in said groove.

3. The range detector according to claim 1, wherein
in a direction perpendicular to an axis line of the moving portion, a width of the moving portion is greater than inner width of the holes.

4. The range detector according to claim 1, wherein
the holes are through holes penetrating the guide portion.

5. The range detector according to claim 4, wherein
an opposite end of the holes relative to the sliding surface is opened in the automatic transmission in which a filter filtering an operation fluid is disposed.

6. The range detector according to claim 4, wherein
an opposite end of at least one of the holes relative to the sliding surface is opened in the automatic transmission in which a magnet is disposed.

7. The range detector according to claim 1, wherein
an opposite end of at least one of the holes relative to the sliding surface is closed.

8. The range detector according to claim 1, wherein
the detecting portion includes a non-contact type senor which detects a position of the moving portion without contacting with the moving portion and a specify circuit which specifies a range of the transmission according to a detected result of the non-contact type sensor.

9. The range detector according to claim 1, wherein
the detecting portion includes a contact type sensor which detects a position of the moving portion by contacting with the moving portion and a specify circuit which specifies a range of the transmission according to a detected result of the contact type sensor.

* * * * *